United States Patent [19]

Ando

[11] 4,392,222
[45] Jul. 5, 1983

[54] COMBINED CIRCUIT AND PACKET SWITCHED SYSTEM

[75] Inventor: Sumitoshi Ando, Tokyo, Japan

[73] Assignee: Kokusai Denshin Denwa Co., Ltd., Japan

[21] Appl. No.: 225,205

[22] Filed: Jan. 15, 1981

[30] Foreign Application Priority Data

Jan. 28, 1980 [JP] Japan .................................. 55-7744

[51] Int. Cl.³ .............................................. H04J 3/12
[52] U.S. Cl. ..................................... 370/60; 370/110.1
[58] Field of Search .............................. 358/256, 258; 340/825.06, 825.07; 370/60, 79, 94, 110.1

[56] References Cited

U.S. PATENT DOCUMENTS

| | | | |
|---|---|---|---|
| 3,647,949 | 3/1972 | Closs et al. | 358/258 |
| 3,796,835 | 3/1974 | Closs et al. | 370/60 |
| 4,152,548 | 5/1979 | Horiki | 370/110.1 |

Primary Examiner—Benedict V. Safourek
Attorney, Agent, or Firm—Martin Novack

[57] ABSTRACT

A new type of exchange system is disclosed which is suitable for the use in a facsimile communication system in which a large amount of information is transmitted in one direction, and the opposite direction has a small amount of information to be transmitted. According to the present invention, said large amount of information is transmitted using a circuit switching technique which assigns a fixed circuit to the forward direction to transmit said information, and a control signal or an acknowledgement signal in the backward direction from the receiving terminal, is handled through a packet switching technique in which a plurality of calls share a single transmission line or a time slot. Thus, a transmission line is used with the same efficiency as packet switching although information is transmitted mainly in one direction, and the switching load of the exchange is as small as in circuit switching.

3 Claims, 4 Drawing Figures

COMBINED CIRCUIT AND PACKET SWITCHED SYSTEM

BACKGROUND OF THE INVENTION

The present invention relates to a data switching system, and, in particular, relates to such a system which is suitable for handling a call of a facsimile terminal which transmits a large amount of information in only one direction.

Two of the prior data switching systems are a circuit switching system and a packet switching system. Those two systems are separately utilized according to the quantity of the information to be transmitted, the cost of the switching system, and the cost of the transmission line. That is to say, a circuit switching system establishes a connection between a calling terminal and a called terminal at the beginning of the communication, and performs no call processing during the communication. Therefore, circuit switching system is suitable for a call which transmits a large amount of data. On the other hand, a packet switching system transmits information by packing data in a packet, and shares a transmission line with other calls. Therefore, a packet switching system is suitable for the terminal which transmits a small amount of data.

It should be noted that in a facsimile communication system for transmitting picture information, a large amount of data is transmitted from the sending terminal to the receiving terminal but the data to be transmitted in the backward direction (from the receiver to the sender) is rather small. Therefore, when a circuit switching system is used for facsimile communication there exists little chance for the backward channel to utilize its ability. When a packet switching system is used for facsimile communication the load of the exchange is sometimes too heavy for handling a large amount of picture data.

SUMMARY OF THE INVENTION

It is an object of the present invention to overcome the disadvantages and limitations of prior switching systems by providing a new and improved switching technique which is suitable for facsimile communication.

It is also an object of the present invention to provied a data switching system which utilizes a transmission line effectively.

According to the present invention, which is suitable in particular for a communication system which transmits a large amount of data in one direction and transmits a small amount of data in an opposite direction, said large amount of data is transmitted through a fixed circuit assigned by circuit switching technique, and said small amount of data in the backward direction is transmitted by packet switching technique in which plural calls share a single transmission line.

BRIEF DESCRIPTION OF THE DRAWINGS

The foregoing and other objects, features, and attendant advantages of the present invention will be better understood by means of the following description ad accompanying drawings wherein.

DESCRIPTION OF THE PREFERRED EMBODIMENT

It should be appreciated that facsimile communication involves a large amount of one way information sent from a sending terminal to a receiving terminal, and is different from a dialog type of communication in telephone communication. The information from a receiving terminal to a sending terminal in facsimile communication is restricted mainly to the control procedure in the call establishing phase and the call terminating phase of facsimile communication. Especially, in a case where a facsimile communication is performed through a conventional telephone circuit, only one direction of communication is utilized for tramsmitting picture information, and the opposite direction is not used during the picture transmission.

In case of recently developed digital facsimile, a digital network is more suitable to transmit facsimile information than a conventional analog telephone network. In digital facsimile transmission, the transmission efficiency will be improved by adopting a high efficiency coding method to shorten the transmission time. When that kind of high efficiency coding method is utilized, a transmission control procedure is inevitable to process transmission errors. An example of the transmission control procedure is HLDC(HIGH LEVEL DATA LINK CONTROL PROCEDURE), which is standardized by ISO (International Organization for Standardization). The HLDC uses concepts of the acknowledement and re-transmission for the correction of transmission error. Therefore, when the HLDC system is used in facsimile communication, the backward channel has to transmit an acknowledgement signal during the transmission of picture information in the forward channel. However, it should be noted that the amount of acknowledgement signals in the backward direction is very small compared with picture information in the forward direction. And further, the acknowledgement signals occur intermittently.

Accordingly, the present invention proposes a switching system suitable for facsimile communication, in which a forward channel has a fixed circuit assigned to a call using a circuit switching technique, and a backward channel shares a single circuit with other calls using packet switching technique.

Figure 1:
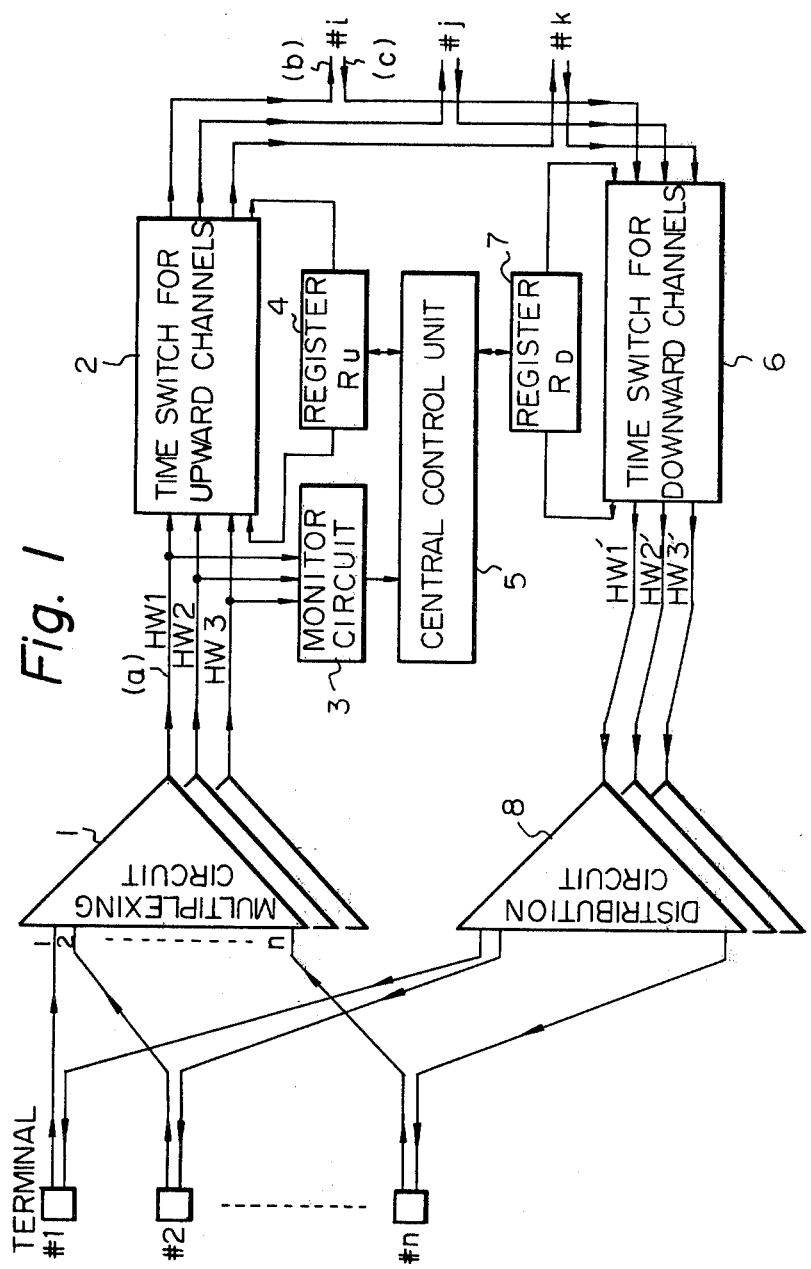
FIG. 1 shows a block diagram of the present combined circuit and packet switching system.

FIG. 1 shows the block diagram of an exchange in which a forward channel is provided through circuit switching technique, a backward channel is provided through packet switching technique, and a digital division multiplex time concept is applied. In FIG. 1, the reference symbols #1 through #n are terminal equipment which is in the present embodiment a facsimile terminal having both sending and receiving functions. The reference numeral 1 is a multiplexing circuit for multiplexing the signals from the terminals #1 through #n into a time division multiplex highway. The highways HW1 through HW3, and HW1' through HW3' are time division multiplex highways having time slots for #1 through #n channels. The reference numeral 2 is a time switch for upward channels, 3 is a monitor circuit which detects a call request signal and a clearing signal from terminals #1 through #n, 4 is a register for assembling control signals from terminals into a packet which is transmitted on a predetermined signaling time slot. The reference numeral 5 is a central control unit for the control of the whole system. The symbols #i, #j and #k are time division multiplex trunk lines, 6 is a time switch for downward channels, 7 is a register $R_D$ for disassembling a received packet to control signal on the related time slot, and 8 is a distribution circuit for putting time multiplexed signals to terminal lines. In FIG. 1, only three pairs of multiplexing circuits and distribution circuits are shown and terminals are connected to the first ones respectively for the sake of the simplicity of the drawing. The time switches 2 and 6 are so called T-switch which can connect any input time slot to any output time slot on any highway.

Figure 2:
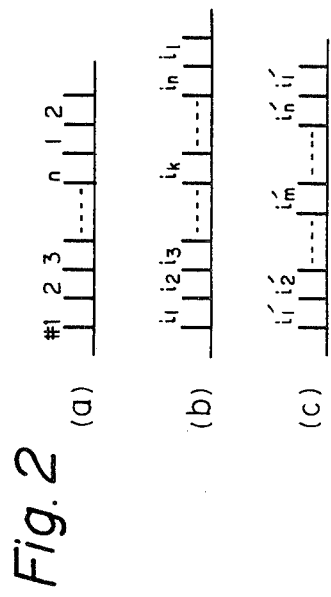
FIG. 2 shows brief frame structure of the multiplexed channels on each point in FIG. 1.

FIG. 2(a) shows the time slots of the highways HW1 through HW3 and HW1' through HW3'. FIG. 2(b) shows the time slots in the upward direction of the time division multiplex trunk line, and FIG. 2(c) shows the time slots in the downward direction of the time division multiplex trunk line.

In FIG. 1, upward direction channels which come from the terminals #1 through #n are multiplexed by the multiplexing circuit 1 into the highway $HW_1$ having n time slots. The highways HW2 and HW3 are also connected to the time switch 2. Then, the time switch 2 performs the switching operation between the time slots of the input highway HW1 through HW3 and the output trunk lines #1 through #3. Conversely, downward direction channels of the terminals #1 through #n receive information from some time slot on the input trunk lines #i, #j and #k switched by the time switch 6, and through the highways HW1', HW2' or HW3', and the distribution circuit 8.

An important feature of the present invention is the assignment of a time slot on trunk lines #i through #k. Suppose that the first terminal #1 which originates a call is to be connected to the trunk line #i. The call request signal from the terminal #1 is detected by the monitor circuit 3 and passed to the central processing unit 5, which analyze the number of the destination terminal, and assign a time slot on the time division multiplex trunk line #i. The time slot thus assigned is for instance the time slot $i_k$ in FIG. 2(b). That time slot $i_k$ is kept for transmitting facsimile information during the call duration. On the other hand, the downward direction channel handles only control signals relating to that call. Therefore, the time slot on the trunk line #i is not assigned to that call. Instead, a signalling time slot (for instance, the time slot $i_m'$ in FIG. 2(c)) is used for transmitting said control signals, and that time slot $i_m'$ is shared by other calls. That is to say, the time slot for the backward channel is shared by plural calls in packet form. The packets for transmitting the control signals are stored in the register $R_D$, and each control signal in that register $R_D$ is put on the related time slot in the highways HW1' through HW3', then, that control signal is forwarded to the related terminal via the distribution circuit 8. In the case of the example of the terminal #1, the packet which includes the control signals to that terminal #1 is disassembled in the register $R_D$, and the original control signals are sent to the terminal through the time switch 6, the time slot #1 on the highway HW1' (see FIG. 2(a)), and the distribution circuit 8.

Figure 3:
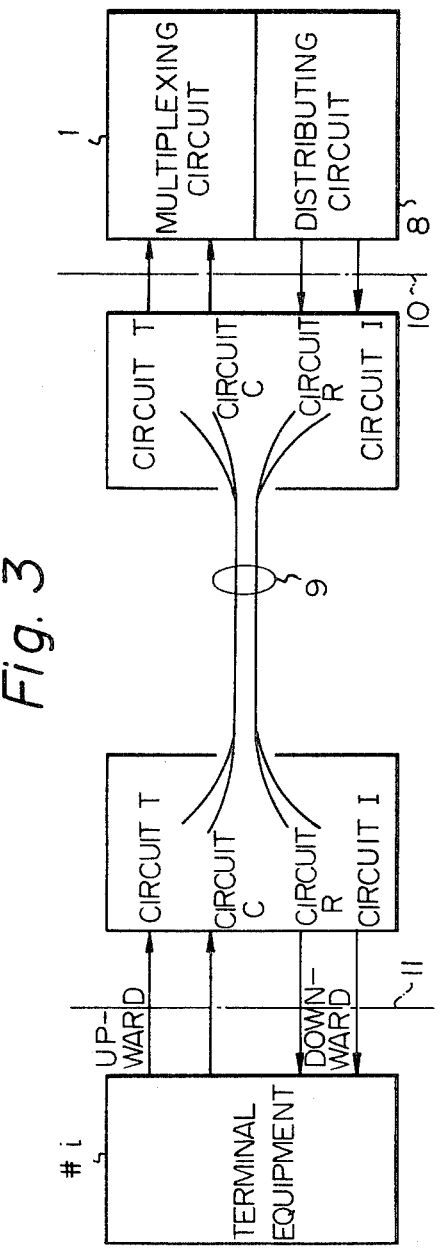
FIG. 3 shows the concept of the interface between a terminal and an exchange.

Now, the detection of the call request and the call clearing is described hereinafter. The CCITT recommendation X-21 for the circuit switching system can be applied to the example of FIG. 1. As shown in FIG. 3, in the X-21, two kinds of interchange circuits (circuits T and R for the transfer of binary data, circuits C and I for the transfer of control) are provided in the interfaces (the exchange side interface 10, and the terminal side interface 11) of the terminal line 9. The status (ON or OFF) of those interchange circuits indicate the call request or the call clearing.

The monitoring of status (ON or OFF) is performed by the monitor circuit in the exchange after the status of plural terminal lines are multiplexed into the highway. Therefore, the multiplexing circuit 1 must code the status of the interchange circuits T and C into binary information and multiplex them into a highway. The frame structure for that time division multiplexing can use the method of X-50 recommended by CCITT.

Figure 4:
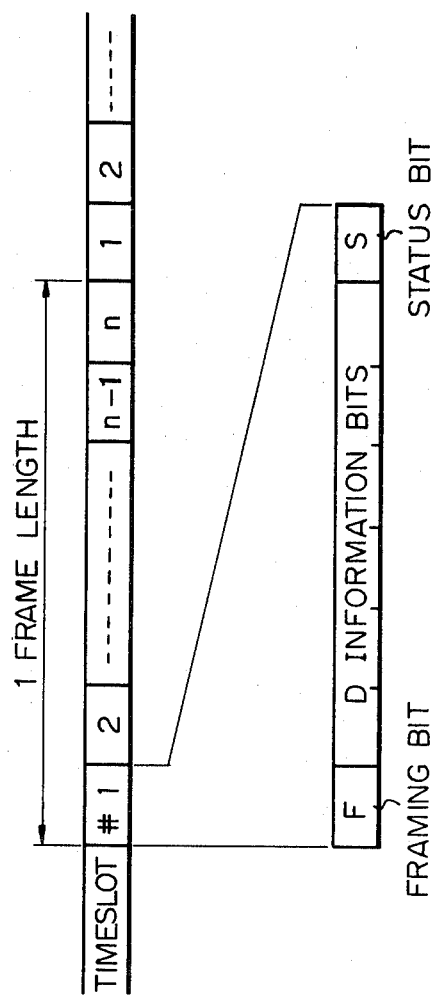
FIG. 4 shows the example of a frame format structure and of a channel on a line.

FIG. 4 shows the frame structure according to the X-50. In FIG. 4, each time slot assigned to an individual channel has 8 bits which contain one framing bit(F), 6 information bits(D); for the information on the circuit T, and one status bit(S); for the status of the circuit C. Thus, the monitor circuit in the exchange can detect the call request and the call clearing of a terminal by monitoring the S and D bits.

The above description clarified the detection of a call request and call clearing of a terminal. On the other hand, the signalling system on the trunk lines between exchanges can be arbitrary. When the time division multiplexed trunk lines #i through #k are used as shown in FIG. 1, a common channel signalling system can be applied, and of course a de-centralized signalling system like the X-71 recommended by CCITT is also possible. Those signalling systems are conventional to those skilled in the art.

Now, the detection and the transfer of the acknowledgement signal in the backward path, which is the path from the receiving terminal to the sending terminal, is described. When the terminal #2 in FIG. 1 is a receiving terminal, the upward direction channel from the terminal #2 is the backward path. The acknowledgement signal related to the information received in the downward direction channel is transmitted on the backward path or the upward direction channel. The exchange should assemble the acknowledgement signals into a packet and send the packet in a signalling time slot of a trunk line. Namely, the register $R_u$ monitors the time slot related to such a backward path in an upward direction channel, and extracts an acknowledgement signal from the terminal. Then, the register $R_u$ assembles a packet by attaching to the acknowledgement signal the address which is determined in the call establishment phase, and puts the packet in the queue for the signalling time slot. The packets in the queue are handled in the same manner as a conventional packet switching system, and each packet is transmitted sequentially. On the other hand, a packet from a trunk line is stored in the register $R_D$ and disassembled to a control signal, which is sent to the related terminal.

The present invention is not restricted to the application for facsimile communication, although the above embodiment is described in accordance with facsimile communication. Further, although time division multiplex switching system is described, it should be appreciated that a space division switching system can also be used in implementing the present invention.

As described above, according to the present invention, a large amount of information is handled by circuit switching technique, and a small amount of information is handled by a packet switching technique. Therefore, the efficiency of the transmission line is higher than that in a conventional circuit switching system, and the load to the exchange is smaller than that in a packet system. Therefore, in a case of facsimile communication in which information is transmitted mainly in one direction, the present invention provides the minimum exchange cost and the minimum transmission cost.

From the foregoing, it will now be apparent that a new and improved switching system has been found. It should be understood of course that the embodiment disclosed is merely illustrative and is not intended to limit the scope of the invention. Reference should be made to the appended claims, therefore, rather than the specification as indicating the scope of the invention.

What is claimed is:

1. A combined circuit and packet switching system coupled with a plurality of terminals and trunk lines for connecting each of said terminals to one of the trunk lines with efficient use of the trunk lines, each of said terminals generating a relatively large amount of information continuously in a forward direction from the terminal to the switching system and a relatively small amount of control information relating to said relatively large amount of information in a backward direction from the switching system to (a) a fixed circuit is assigned in one of said trunk lines for forward information generated by said terminal through a circuit exchange technique; and
   (b) a transmission channel for transmitting said control information is provided by packet switching technique wherein plural calls in the backward direction share a single trunk line simultaneously.

2. A combined circuit and packet switching system according to claim 1, wherein said system is utilized in facsimile communication where data volume in a forward direction of each call is much larger than that in the backward direction.

3. A combined circuit and packet switching system coupled with a plurality of terminals and trunk lines for connecting each of said terminals to one of the trunk lines with efficient use of the trunk lines, each of said terminals generating a relatively large amount of information continuously in a forward direction and receiving a relatively small amount of control information relating to said relatively large amount of information, said system comprising: a plurality of outgoing and incoming highways; multiplexing circuits connected to the terminals via terminal lines to multiplex signals from the terminals to the highways on a time division multiplexing basis; a first time switch connected between outgoing highways and outgoing ones of the trunk lines to switch any time slot in outgoing highways to a designated time slot in outgoing trunk lines; a first register for assembling control signals from terminals into a packet connected to the input and the output of said first time switch; distribution circuits, having inputs connected to the incoming highways, the outputs of the distribution circuits being connected to each of the terminal lines for distributing time multiplexed signals to each terminal line; a second time switch connected between incoming ones of the trunk lines and the incoming highways to switch any time slot in an incoming trunk line to a desired time slot in an incoming highway connected to said distribution circuit; a second register connected to the output and the input of said second time switch to disassemble a packet to put an individual control signal on the particular time slot on the incoming highway; a central control unit for controlling the operation of said first and second time division switches and the first and the second registers so that a transmission channel for forwarding the information from a sending terminal is assigned in fixed manner by circuit switching technique in said time switches, and a transmission channel for forwarding a control signal from a receiving terminal is assigned by packet switching technique using the registers which assemble and disassemble packets.

* * * * *